(12) United States Patent
Kim et al.

(10) Patent No.: US 9,008,000 B2
(45) Date of Patent: Apr. 14, 2015

(54) POWER HEADROOM REPORTING IN WIRELESS COMMUNICATION SYSTEM FOR SUPPORTING A PLURALITY OF SERVING CELLS

(75) Inventors: Dongcheol Kim, Anyang (KR); Hangyu Cho, Anyang (KR)

(73) Assignee: LG Electronics Inc., Seoul (KR)

( * ) Notice: Subject to any disclaimer, the term of this patent is extended or adjusted under 35 U.S.C. 154(b) by 150 days.

(21) Appl. No.: 13/877,123

(22) PCT Filed: Oct. 4, 2011

(86) PCT No.: PCT/KR2011/007307
§ 371 (c)(1),
(2), (4) Date: Mar. 29, 2013

(87) PCT Pub. No.: WO2012/044136
PCT Pub. Date: Apr. 5, 2012

(65) Prior Publication Data
US 2013/0188563 A1    Jul. 25, 2013

Related U.S. Application Data

(60) Provisional application No. 61/388,616, filed on Oct. 1, 2010.

(51) Int. Cl.
*H04W 24/10*    (2009.01)
*H04W 52/36*    (2009.01)

(52) U.S. Cl.
CPC .......... *H04W 24/10* (2013.01); *H04W 52/365* (2013.01); *Y02B 60/50* (2013.01)

(58) Field of Classification Search
CPC .......... H04W 52/365; H04W 52/146; H04W 52/242; H04W 52/346; H04W 24/10; H04W 72/1284; Y02B 60/50; H04L 1/0026

USPC .......... 370/328, 329, 252, 311; 375/260; 455/522
See application file for complete search history.

(56) References Cited

U.S. PATENT DOCUMENTS

| 2009/0175187 A1 | 7/2009 | Jersenius et al. |
| 2010/0158147 A1* | 6/2010 | Zhang et al. .......... 375/260 |

(Continued)

FOREIGN PATENT DOCUMENTS

| WO | 2009/022812 | 2/2009 |
| WO | 2009/118367 | 10/2009 |

OTHER PUBLICATIONS

PCT International Application No. PCT/KR2011/007307, Written Opinion of the International Searching Authority dated Apr. 27, 2012, 14 pages.

*Primary Examiner* — Afsar M Qureshi
(74) *Attorney, Agent, or Firm* — Lee, Hong, Degerman, Kang & Waimey (57) ABSTRACT

In the terminal device of the present invention, a transmitter can transmit any one of a maximum transmission power information, a maximum power reduction (MPR) information, and a terminal PHR information of the terminal in each one or more serving cells of the terminal among the plurality of serving cells and the PHR information of each one or more serving cells of the terminal, to a base station and can transmit the changed MPR information, the changed maximum transmission power information, or the changed terminal PHR information when a first PHR triggering condition is generated therefrom. A processor controls the transmitter to enable the transmitter to transmit the changed MPR information, the changed maximum transmission power information, or the changed terminal PHR information when the MPR information or the maximum transmission power information is changed.

8 Claims, 7 Drawing Sheets

(56) References Cited

U.S. PATENT DOCUMENTS

| | | | |
|---|---|---|---|
| 2011/0085483 A1* | 4/2011 | Yeon et al. | 370/311 |
| 2011/0292874 A1* | 12/2011 | Ho et al. | 370/328 |
| 2012/0314640 A1* | 12/2012 | Kim et al. | 370/311 |
| 2013/0010720 A1* | 1/2013 | Lohr et al. | 370/329 |
| 2013/0028231 A1* | 1/2013 | Zhang et al. | 370/329 |

* cited by examiner

POWER HEADROOM REPORTING IN WIRELESS COMMUNICATION SYSTEM FOR SUPPORTING A PLURALITY OF SERVING CELLS

CROSS-REFERENCE TO RELATED APPLICATIONS

This application is the National Stage filing under 35 U.S.C. 371 of International Application No. PCT/KR2011/007307, filed on Oct. 4, 2011, which claims the benefit of U.S. Provisional Application Ser. No. 61/388,616, filed on Oct. 1, 2010, the contents of which are all hereby incorporated by reference herein in their entirety.

TECHNICAL FIELD

The present invention relates to a wireless communication, and more particularly, to a method of transmitting a power headroom reporting (PHR) in a wireless communication system supporting a plurality of serving cells and a user equipment device therefor.

BACKGROUND ART

3GPP LTE ($3^{rd}$ generation partnership project long term evolution: hereinafter abbreviated 'LTE') and LTE-advanced (hereinafter abbreviated 'LTE-A') communication systems are schematically explained as an example of a mobile communication system to which the present invention is applicable.

Figure 1:
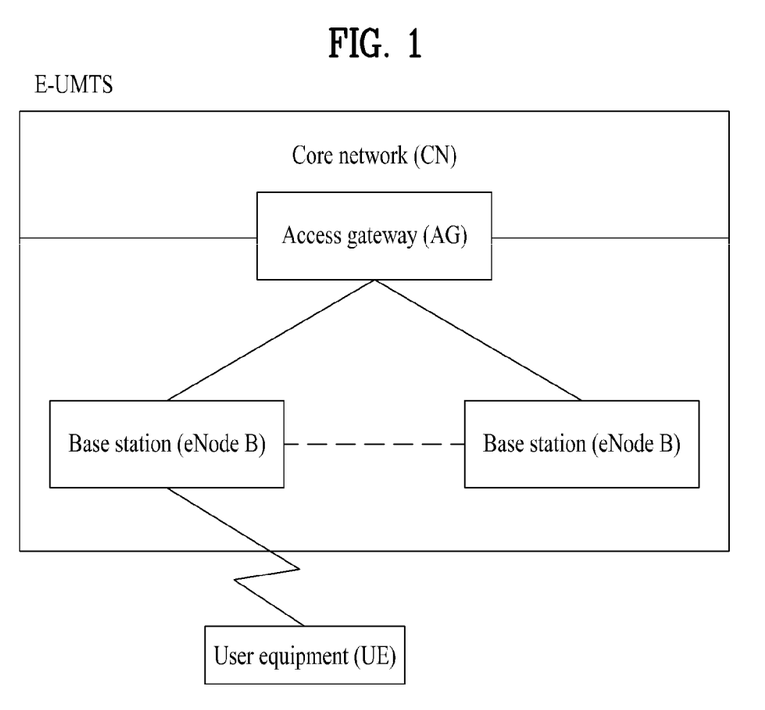
FIG. 1 is a schematic diagram of E-UMTS network structure as one example of a wireless communication system.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 8 and release 9 of "$3^{rd}$ generation partnership project; technical specification group radio access network", respectively.

Referring to FIG. 1, E-UMTS includes a user equipment (UE), a base station (BS, eNode B, or eNB), and an access gateway (hereinafter abbreviated AG) connected to an external network in a manner of being situated at the end of a network (E-UTRAN). The base station may be able to simultaneously transmit multi data streams for a broadcast service, a multicast service and/or a unicast service.

One base station contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. A base station controls data transmissions/receptions to/from a plurality of the user equipments. For a downlink (hereinafter abbreviated DL) data, the base station informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the base station informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between base stations. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on a wideband code division multiple access (WCDMA). Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

Recently, ongoing standardization of the next technology of LTE is performed by 3GPP. Such technology shall be named LTE-A in the present specification. Big differences between LTE system and LTE-A system may include a system bandwidth difference and an adoption of a relay node.

The goal of LTE-A system is to support maximum 100 MHz wideband. To this end, LTE-A system uses carrier aggregation or bandwidth aggregation to achieve the wideband using a plurality of frequency blocks.

According to the carrier aggregation, a plurality of frequency blocks are used as one wide logical frequency band to use wider frequency band. And, a bandwidth of each frequency block may be defined based on a bandwidth of a system block used by LTE system. And, each frequency block is transmitted using a component carrier.

Although the carrier aggregation technology is adopted by the LTE-A system, which is a next generation communication system, a conventional technology is unable to support an UL power control operation of a user equipment in a multi-carrier system. In particular, it has never been studied yet on a method of reporting a PHR (power head room) for a multi-carrier, a PHR configuration method for PHR transmission, a format, and the like.

DISCLOSURE OF THE INVENTION

Technical Tasks

A technical task intended to achieve by the present invention is to provide a method of transmitting a power headroom reporting (PHR), which is transmitted by a user equipment, in a wireless communication system supporting a plurality of serving cells.

Another technical task intended to achieve by the present invention is to provide a user equipment device transmitting a power headroom reporting (PHR) in a wireless communication system supporting a plurality of serving cells.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment of the present invention a method of transmitting a power headroom reporting (PHR), which is transmitted by a user equipment in a wireless communication system supporting a plurality of serving cells may include the steps of transmitting one of a maximum transmit power information, a maximum power reduction (MPR) information and a user equipment PHR information configured to the user equipment according to at least one serving cell among a plurality of the serving cells and a PHR information according to at least one serving cell configured to the user equipment to a base station if a first PHR triggering condition occurs and transmitting changed MPR information, changed maximum transmit power information, or changed user equipment PHR information if the MPR information or the maximum transmit power information changes. The changed MPR information, the changed maximum transmit power information, or the changed user equipment PHR information may be transmitted on each of the at least one serving cell. If the changed MPR information, the changed maximum transmit power information, or the changed user equipment PHR information changed for a specific serving cell only, the changed MPR information, the changed maximum transmit power information, or the changed user equipment PHR information may be transmitted on all of the at least one serving cell configured to the user equipment. The user equipment PHR information may correspond to a value resulted from subtracting a total power for scheduled resources from a maximum transmittable power level of the user equipment. The changed MPR information, the changed maximum transmit power information, or the changed user equipment PHR information may be transmitted between a occurring timing point of the first PHR triggering condition and the occurring timing point of a second PHR triggering condition corresponding to the occurring timing point of a next PHR triggering condition.

To further achieve these and other advantages and in accordance with the purpose of the present invention, according to another embodiment of the present invention a user equipment for transmitting a power headroom reporting (PHR) in a wireless communication system supporting a plurality of serving cells may include a transmitter configured to transmit one of a maximum transmit power information, a maximum power reduction (MPR) information and a user equipment PHR information configured to the user equipment per at least one serving cell among a plurality of the serving cells and a PHR information according to at least one serving cell configured to the user equipment to a base station if a first PHR triggering condition occurs and wherein the transmitter is configured to transmit changed MPR information, changed maximum transmit power information, or changed user equipment PHR information and a processor configured to control the transmitter to transmit the changed MPR information, the changed maximum transmit power information, or the changed user equipment PHR information if the MPR information or the maximum transmit power information changes. The transmitter may be configured to transmit the changed MPR information, the changed maximum transmit power information, or the changed user equipment PHR information to the at least one serving cell, respectively. If the changed MPR information, the changed maximum transmit power information, or the changed user equipment PHR information changed for a specific serving cell only, the transmitter is configured to transmit the changed MPR information, the changed maximum transmit power information, or the changed user equipment PHR information on all of the at least one serving cell configured to the user equipment. The user equipment PHR information may correspond to a value resulted from subtracting a total power for scheduled resources from a maximum transmittable power level of the user equipment. The transmitter may be configured to transmit the changed MPR information, the changed maximum transmit power information, or the changed user equipment PHR information between a occurring timing point of the first PHR triggering condition and the occurring timing point of a second PHR triggering condition corresponding to the occurring timing point of a next PHR triggering condition.

Advantageous Effects

According to various embodiments of the present invention, a base station is able to easily and precisely recognize a power status of a user equipment, thereby providing a considerable help in resource allocating or scheduling.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes IEEE (institute of electrical and electronics engineers) 802.16 system, they are applicable to other random mobile communication systems except unique features of IEEE 802.16 system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS), and the like. And, assume that a base station is a common name of such a random node of a network stage communicating with a terminal as a Node B, an eNode B, a base station (BS), an access point (AP) and the like.

In a mobile communication system, a user equipment may be able to receive information from a base station in downlink and transmit the information to the base station in uplink. The informations transmitted or received by user equipment may include data and various control informations. And, various kinds of physical channels may exist in accordance with types and usages of the informations transmitted or received by the user equipment.

Figure 2:
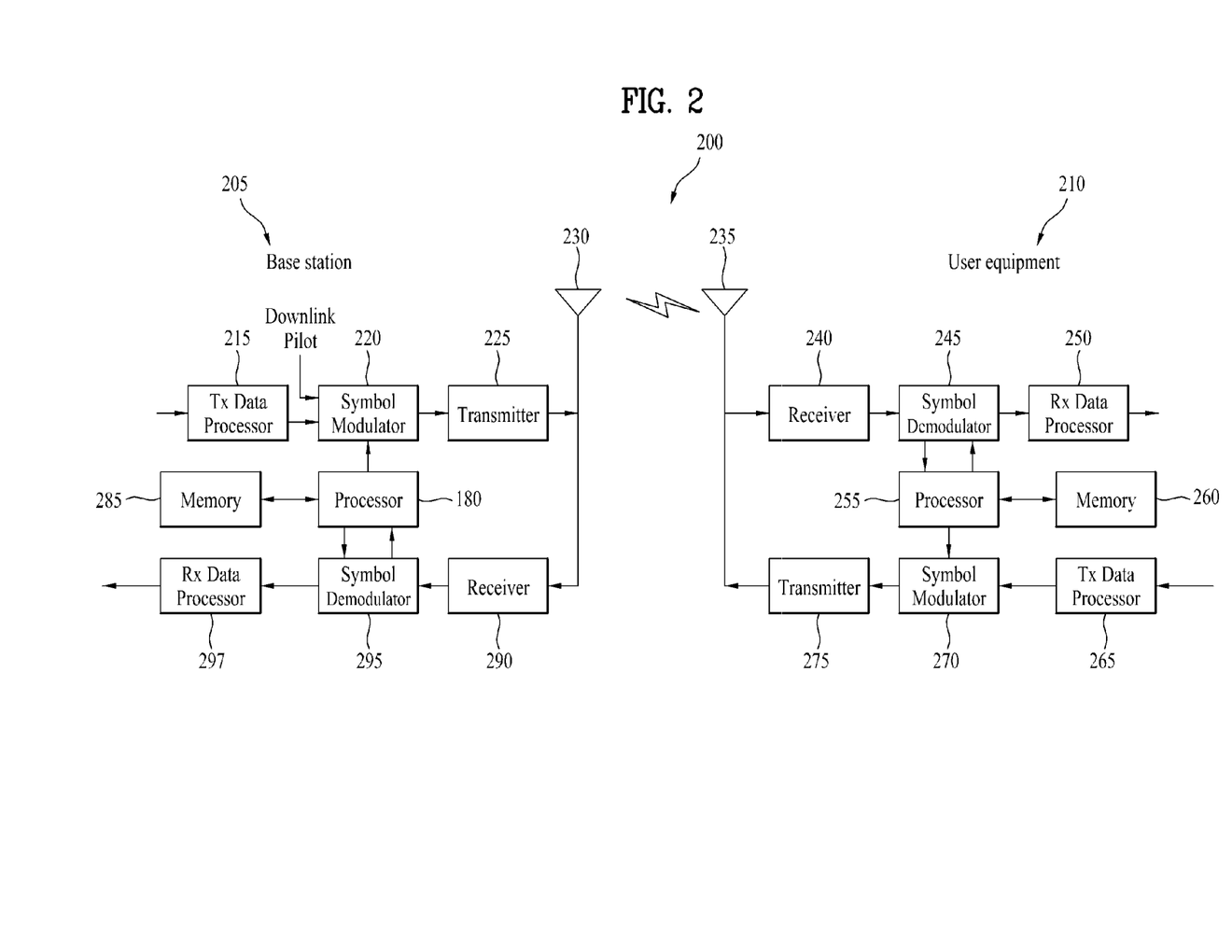
FIG. 2 is a block diagram for configurations of a base station 205 and a user equipment 210 in a wireless communication system 200.

FIG. 2 is a block diagram for configurations of a base station 205 and user equipment 210 in a wireless communication system 200.

Although one base station 205 and one user equipment 210 are shown in the drawing to schematically represent a wireless communication system 200, the wireless communication system 200 may include at least one base station and/or at least one user equipment.

Referring to FIG. 2, a base station 205 may include a transmitted (Tx) data processor 215, a symbol modulator 220, a transmitter 225, a transceiving antenna 230, a processor 280, a memory 285, a receiver 290, a symbol demodulator 295 and a received data processor 297. And, a user equipment 210 may include a transmitted (Tx) data processor 265, a symbol modulator 270, a transmitter 275, a transceiving antenna 235, a processor 255, a memory 260, a receiver 240, a symbol demodulator 255 and a received data processor 250. Although the base station/mobile station 205/210 includes one antenna 230/235 shown in the drawing, each of the base station 205 and the user equipment 210 includes a plurality of antennas. Therefore, each of the base station 205 and the user equipment 210 according to the present invention supports an MIMO (multiple input multiple output) system. And, the base station 205 according to the present invention may support both SU-MIMO (single user-MIMO) and MU-MIMO (multi user-MIMO) systems.

In downlink, the transmitted data processor 215 receives traffic data, performs coding on the received traffic data by formatting, interleaves the coded traffic data, modulates (or symbol maps) the interleaved data, and then provides modulated symbols (data symbols). The symbol modulator 220 provides a stream of symbols by receiving and processing the data symbols and pilot symbols.

The symbol modulator 220 multiplexes the data and pilot symbols together and then transmits the multiplexed symbols to the transmitter 225. In doing so, each of the transmitted symbols may include the data symbol, the pilot symbol or a signal value of zero (i.e., null). In each of symbol durations, pilot symbols may be contiguously transmitted. In doing so, the pilot symbols may include symbols of frequency division multiplexing (FDM), orthogonal frequency division multiplexing (OFDM), time division multiplexing (TDM), or code division multiplexing (CDM).

The transmitter 225 receives the stream of the symbols, converts the received stream to at least one or more analog signals, additionally adjusts the analog signals (e.g., amplification, filtering, frequency upconverting, etc.), and then generates a downlink signal suitable for a transmission on a radio channel. Subsequently, the downlink signal is transmitted to the user equipment via the transmitting antenna 230.

In the configuration of the user equipment 210, the receiving antenna 235 receives the downlink signal from the base station and then provides the received signal to the receiver 240. The receiver 240 adjusts the received signal (e.g., filtering, amplification and frequency downconverting), digitizes the adjusted signal, and then obtains samples. The symbol demodulator 245 demodulates the received pilot symbols and then provides them to the processor 255 for channel estimation.

The symbol demodulator 245 receives a frequency response estimated value for downlink from the processor 255, obtains data symbol estimated values (i.e., estimated values of the transmitted data symbols) by performing data modulation on the received data symbols, and then provides the data symbol estimated values to the received (Rx) data processor 250. The received data processor 250 reconstructs the transmitted traffic data by performing demodulation (i.e., symbol demapping, deinterleaving and decoding) on the data symbol estimated values.

The processing by the symbol demodulator 245 and the processing by the received data processor 250 are complementary to the processing by the symbol modulator 220 and the processing by the transmitted data processor 215 in the base station 205, respectively.

Regarding the user equipment 210 in uplink, the transmitted data processor 265 provides data symbols by processing the traffic data. The symbol modulator 270 provides a stream of symbols to the transmitter 275 by receiving the data symbols, multiplexing the received data symbols, and then performing modulation on the multiplexed symbols. The transmitter 275 generates an uplink signal by receiving the stream of the symbols and then, processing the received stream. The generated uplink signal is then transmitted to the base station 205 via the transmitting antenna 235.

In the base station 205, the uplink signal is received from the user equipment 210 via the receiving antenna 230. The receiver 290 obtains samples by processing the received uplink signal. Subsequently, the symbol demodulator 295 provides pilot symbols received in uplink and a data symbol estimated value by processing the obtained samples. The received data processor 297 reconstructs the traffic data transmitted from the user equipment 210 by processing the data symbol estimated value.

The processor 255/280 of the user equipment/base station 210/205 directs operations (e.g., control, adjustment, management, etc.) of the user equipment/base station 210/205. The processor 255/280 may be connected to the memory unit 260/285 configured to store program codes and data. The memory 260/285 is connected to the processor 255/280 to store operating systems, applications and general files.

The processor 255/280 may be called one of a controller, a microcontroller, a microprocessor, a microcomputer and the like. And, the processor 255/280 may be implemented using hardware, firmware, software and/or any combinations thereof In the implementation by hardware, the processor 255/280 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 255/280 or saved in the memory 260/285 to be driven by the processor 255/280.

Layers of a radio protocol between a user equipment and a base station may be classified into $1^{st}$ layer L1, $2n^d$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between UE and network. A user equipment and a base station may be able to exchange RRC messages with each other via a radio communication network using RRC layers.

Figure 3:
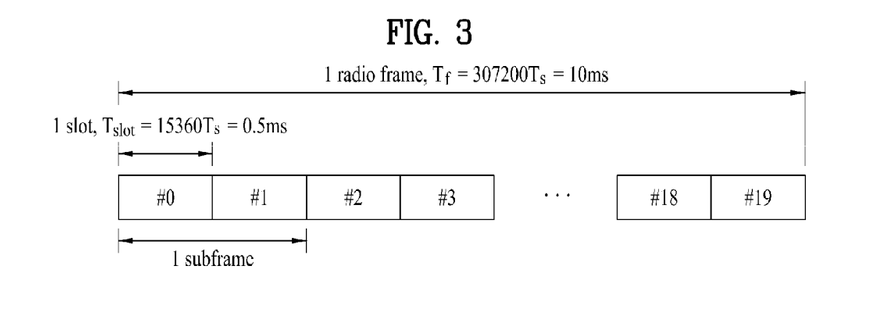
FIG. 3 is a diagram for one example of a radio frame structure used in 3GPP LTE system as one example of a mobile communication system.

FIG. 3 is a diagram for one example of a radio frame structure used in 3GPP LTE system as one example of a mobile communication system.

Referring to FIG. 3, one radio frame has a length of 10 ms ($327,200 \times T_S$) and is constructed with 10 subframes in equal size. Each of the subframes has a length of 1 ms and is constructed with two slots. Each of the slots has a length of 0.5 ms ($15,360 \times T_S$). In this case, $T_S$ indicates a sampling time and is represented as $T_S = 1/(15 \text{ kHz} \times 2048) = 3.2552 \times 10^{-8}$ (i.e., about 33 ns). The slot includes a plurality of OFDM symbols in a time domain and also includes a plurality of resource blocks (RBs) in a frequency domain.

In the LTE system, one resource block (RB) includes '12 subcarriers×7 or 6 OFDM symbols' or SC-FDMA (single carrier-frequency division multiple access) symbol. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols or SC-FDMA symbols included in a slot may be modified in various ways.

Figure 4:
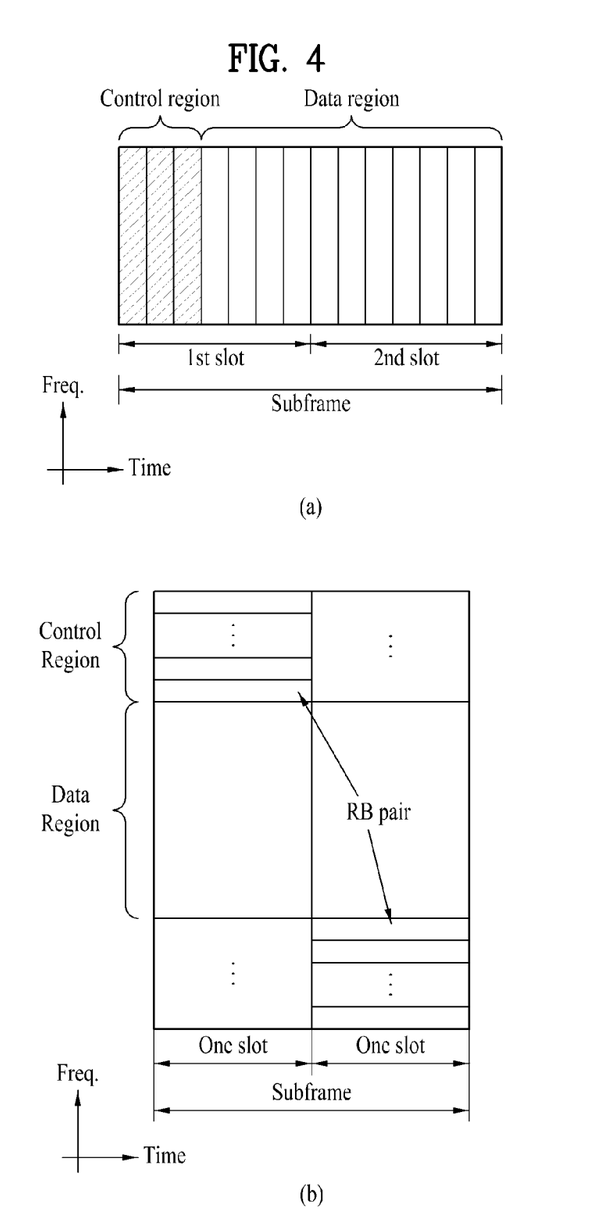
FIG. 4 is a diagram for structures of downlink and uplink subframes in 3GPP LTE system as one example of a mobile communication system.

FIG. 4 is a diagram for structures of downlink and uplink subframes in 3GPP LTE system as one example of a mobile communication system.

Referring to FIG. 4a, one DL subframe includes 2 slots in a time domain. Maximum 3 fore OFDM symbols of the first slot within the DL subframe correspond to a control region for allocating control channels thereto and the rest of the OFDM symbols correspond to a data zone for allocating PDSCH (physical downlink shared channel) thereto.

DL (downlink) control channels used in 3GPP LTE system or the like include PCFICH (physical control format indicator channel), PDCCH (physical downlink control channel), PHICH (physical hybrid-ARQ indicator channel), etc. The PCFICH carried on a first OFDM symbol of a subframe carries the information on the number of OFDM symbols (i.e., a size of a control region) used for the transmission of control channels within the subframe. The control information carried on the PDCCH is called downlink control information (hereinafter abbreviated DCI). The DCI indicates a UL resource allocation information, a DL resource allocation information, a UL transmit power control command for random user equipment groups and the like. The PHICH carries ACK/NACK (acknowledgement/not-acknowledgement) signal for UL HARQ (hybrid automatic repeat request). In particular, the ACK/NACK signal for UL data transmitted by a user equipment is carried on PHICH.

In the following description, PDCCH of DL physical channel is explained.

First of all, a base station is able to transmit resource allocation and transmission format (this is so-called DL grant) of PDSCH, resource allocation information (this is so-called UL grant) of a physical UL shared channel, an aggregation of transmit power control (TPC) commands for a random user equipment and individual user equipments in a group, activation of VoIP (voice over internet protocol) and the like via PDCCH. A plurality of PDCCHs may be transmitted within a control region and a user equipment may be able to monitor a plurality of the PDCCHs. The PDCCH is constructed with aggregation of one or several contiguous CCEs (control channel elements). The PDCCH constructed with the aggregation of one or several CCEs may be transmitted via the control region after completion of subblock interleaving. The CCE is a logical allocation unit used to provide the PDCCH with a coding rate in accordance with a status of a radio channel. The CCE corresponds to a plurality of resource element groups. The format of the PDCCH and the bit number of available PDCCH are determined in accordance with the correlation between the number of CCEs and the coding rate provided by the CCEs.

The control information carried on the PDCCH may be called DL control information (hereinafter abbreviated DCI). Table 1 shows the DCI according to DCI format.

TABLE 1

| DCI Format | Description |
| --- | --- |
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI form at 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

DCI format 0 indicates UL resource allocation information, DCI format 1~2 indicates DL resource allocation information, and DCI format 3 or 3A indicates a transmit power control (hereinafter abbreviated TPC) command for random UE groups.

DCI format 3/3A includes TPC commands for a plurality of user equipments. In case of the DCI format 3/3A, a CRC is masked with a TPC-ID by a base station. The TPC-ID is a demasking identifier for a user equipment to monitor PDCCH carrying a TPC command. The TPC-ID may correspond to an identifier used for decoding the PDCCH to check whether the TPC command is transmitted on the PDCCH by the user equipment. The TPC-ID can be defined by reusing such a conventional identifier as C-RNTI (radio network temporary identifier), PI-RNTI, SC-RNTI, or RA-RNTI. Or, the TPC-ID can be defined by a new identifier. The TPC-ID is different from the C-RNTI. The C-RNTI is an identifier for a specific user equipment whereas the TPC-ID is the identifier for the user equipments of a specific set within a cell. The TPC-ID is different from the PI-RNTI, the SC-RNTI, and the RA-RNTI in a point that the PI-RNTI, the SC-RNTI, and the RA-RNTI are the identifiers for all user equipments within a cell. In case that a DCI includes a TPC command for N number of user equipment, it's because only the N number of user equipments need to receive the TPC commands. If the DCI includes TPC commands for all user equipments within a cell, the TCP-ID becomes an identifier for all user equipments within the cell.

A user equipment searches for the TPC-ID in a search space in a manner of monitoring a set of PCDDH candidates. In this case, the TPC-ID can be found in a common search space or a user equipment-specific (UE specific) search space. The common search space is a search space for all user equipments within a cell and the UE specific search space is the search space for a specific user equipment. If a CRC error is not detected on a corresponding candidate PDCCH by demasking the TPC-ID, the user equipment may be able to receive a TPC command on the PDCCH.

An identifier for PDCCH carrying a plurality of TPC commands only, TPC-ID is defined. If the TPC-ID is detected, a user equipment receives a TPC command on a corresponding PDCCH. The TPC command is used to control a transmit power of an UL channel, thereby preventing from a failure of transmission to a base station due to a wrong power control or interference to a different user equipment.

In the following description, a method of mapping a resource to transmit PDCCH, which is performed by a base station in 3GPP LTE system and the like, is briefly described.

In general, the base station may be able to transmit scheduling allocation information and other control informations via PDCCH. A physical control channel may be transmitted as one aggregation or a plurality of contiguous control channel elements (CCEs). In this case, one control channel element (hereinafter abbreviated CCE) includes 9 resource element groups (REGs). The number of REGs failing to be allocated to PCFICH (physical control format indicator channel) or PHICH (physical hybrid automatic repeat request indicator channel) is $N_{REG}$. The number of CCEs available for a system ranges 0 to '$N_{cCE}$-1', where $N_{CCE}=[N_{REG}/9]$. The PDCCH supports such a multiple format as shown in Table 2. One PDCCH including n contiguous CCEs starts with a CCE that executes 'i mod n=0', where 'i' is a CCE number. Multiple PDCCHs may be transmitted in one subframe.

TABLE 2

| PDCCH format | Number of CCEs | Number of resource-element groups | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

Referring to Table 2, a base station is able to determine a PDCCH format in accordance with how many regions will receive control information and the like. And, a user equipment is able to reduce overhead by reading the control information and the like by CCE unit.

Referring to FIG. 4 (b), a UL subframe can be divided into a control region and a data region in a frequency domain. The control region is allocated to a physical UL control channel (PUCCH) carrying UL control information. And, the data region is allocated to a physical UL shared channel (PUSCH) for carrying user data. In order to maintain the single carrier property, one user equipment does not transmit PUCCH and PUSCH simultaneously. PUCCH for one user equipment is allocated as an RB pair in one subframe. RBs belonging to the RB pair occupy different subcarriers in two slots, respectively. And, frequency hopping is performed on the RB pair allocated to the PUCCH on a slot boundary.

In the following description, a process for a base station to send PDCCH to a user equipment in LTE system is explained.

First of all, a base station determines a PDCCH format in accordance with a DCI (downlink control information) which is to be sent to a user equipment and then attaches a CRC (cyclic redundancy check) to a control information. In this case, the CRC is masked with a unique identifier, which will be called a radio network temporary identifier (hereinafter abbreviated RNTI), in accordance with an owner or usage of PDCCH. If the PDCCH is provided for a specific user equipment, the CRC can be masked with a unique identifier of a user equipment, e.g., C-RNTI (cell-RNTI). If the PDCCH is provided to a paging message, the CRC can be masked with a paging indication identifier, e.g., P-RNTI (paging-RNTI). If the PDCCH is provided for a system information, the CRC can be masked with a system information identifier, e.g., SI-RNTI (system information-RNTI). In order to indicate a random access response which is the response to a transmission of a random access preamble of a user equipment, the CRC can be masked with RA-RNTI (random access-RNTI). Table 3 shows examples of an identifier that masks PDCCH.

TABLE 3

| Type | Identifier | Description |
| --- | --- | --- |
| UE-specific | C-RNTI | used for the UE corresponding to the C-RNTI. |
| Common | P-RNTI | used for paging message. |
| | SI-RNTI | used for system information (It could be differentiated according to the type of system information). |
| | RA-RNTI | used for random access response (It could be differentiated according to subframe or PRACH slot index for UE PRACH transmission). |
| | TPC-RNTI | used for uplink transmit power control command (It could be differentiated according to the index of UE TPC group). |

If C-RNTI is used, PDCCH carries a control information for a corresponding specific user equipment. If a different RNTI is used, PDCCH carries a shared control information received by all or a plurality of user equipments within a cell. The base station generates a coded data by performing a channel coding on the CRC attached DCI. The base station then performs a rate matching according to the number of CCEs allocated to the PDCCH format. Subsequently, the base station generates modulated symbols by modulating the coded data. Thereafter, the base station maps the modulated symbols to the physical resource elements.

3GPP ($3^{rd}$ generation partnership project) calls a next generation wireless communication system of LTE system as LTE-A (long term evolution-advanced) system and then designs the LTE-A system to enable to implement fast and mass data transmission. The LTE-A system adopts a carrier aggregation (CA) technology and then it makes a transmission bandwidth of a user equipment improve and efficiency of a frequency usage increase in a manner of aggregating a plurality of component carriers and then performing a transmission. The LTE-A system may be able to support up to maximum 100 MHz by making a bundle of a plurality of carriers (i.e., multi-carrier) instead of using a single carrier used in a conventional LTE Rel-8/9. In other word, the carrier supporting up to maximum 20 MHz in the conventional LTE Rel-8/9 is re-defined as a component carrier (CC) or a cell. One user equipment may be then able to use up to maximum 5 component carriers (CCs) via the carrier aggregation technology.

A current carrier aggregation (CA) technology is mainly equipped with characteristics as follows.

(1) The CA technology supports an aggregation of contiguous component carriers or cells and the aggregation of discontinuous component carrier or cell.

(2) The number of aggregation in UL and DL or cell may be different with each other. If it is required to have a compatibility with a legacy system, the UL and the DL may consist of an identical number of component carrier or cell.

(3) The CA technology configures a different number of component carrier or cell for the DL/UL, respectively and may be then able to obtain a different transmission bandwidth.

(4) Each component carrier or cell independently transmits a single transport block to a user equipment and is equipped with an independent hybrid automatic repeat request (HARQ) mechanism.

Unlike a legacy LTE system using a single carrier, the carrier aggregation using a plurality of component carriers needs a method of efficiently managing the component carriers. In order to efficiently manage the component carriers, the component carriers can be classified according to a role and property of the component carriers. The component carriers can be divided into a primary component carrier (PCC) and a secondary component carrier (SCC). The primary component carrier is the component carrier to be a center of managing the component carrier in case of using a plurality of component carriers. One primary component carrier is defined in each of user equipments. The primary component carrier (PCC) can be called a primary cell and the like.

Other component carriers except the one primary component carrier are defined as a secondary component carrier (SCC). The secondary component carrier (SCC) can be called a secondary cell (Scell) and the like. The primary cell and the secondary cell are configured by a base station for a user equipment. The primary cell may play a role of a core carrier managing the whole cells, which are aggregated, and the secondary cell may play a role of providing an additional frequency resource to provide a higher transfer rate. For instance, a base station is able to perform an access (RRC) to signal a user equipment via the primary cell. To provide information for security and a higher layer can be performed via the primary cell as well. In practical, in case that there exists a single cell only, the single cell will become a primary cell. In this case, the cell may be able to play a role, which is identical to that of a carrier of a legacy LTE system.

A base station may be able to inform a user equipment of an activated cell or an activated component carrier (ACC) by allocating the activated cell among a plurality of cells. As a result, the user equipment is able to know the activated cell or the activated component carrier (ACC) assigned to the user equipment. And, according to the present invention, it is necessary for the user equipment to report a power headroom reporting (PHR) to the base station according to a cell or carrier in the activated cell or the activated component carrier assigned to the user equipment. Yet, regarding the carrier not scheduled among the at least one activated cell or the activated component carrier assigned to the user equipment, the user equipment may transmit a virtual power headroom report (virtual PHR).

In the following description, a method of signaling a power control message to a user equipment, which is performed by a base station to enable the user equipment to report a power headroom (PH) according to the carrier aggregation (CA) technology adopted by LTE-A system, is described.

According to the current 3GPP standard (3GPP TS 36.321, 36.213, 36.133), a media access control control element (MAC CE) transmitted by a user equipment includes a buffer status report (BSR) control element and a power headroom report (PHR) control element. The buffer status report control element is generated by a process of a buffer status report and reports the data quantity of UL buffer of the user equipment to a service providing base station. The power headroom report (PHR) control element is generated by a process of a power headroom report and the user equipment reports a current power status (power remaining) to the base station. The base station may be able to effectively allocate a radio resource and execute a scheduling decision according to the information on the UL buffer status and the power headroom and the like reported by the user equipment.

In general, a user equipment may be able to trigger (or generate) a power headroom reporting (PHR) in case of the event as follows.

(1) A case that a timer (prohibitPHR-Timer) prohibiting a power headroom reporting (PHR) expires or the timer is greater than a DL_PathlossChange, which is a pre-set value of a transmission path loss, after a PHR transmission when the user equipment has UL resource for a new transmission.

(2) A case that a periodic report timer (PeriodicPHR-Timer) expires.

(3) A case that a power headroom reporting function is configured or re-configured by an upper layer.

The power headroom reporting (PHR) reported by a user equipment to a base station may include two types. One is a type 1 PHR. The type 1 PHR is defined by PHR=Pcmax−$P_{PUSCH}$. In this case, the Pcmax indicates a UE transmission maximum power value configured according to a component carrier or a cell. The Pcmax can also be expressed like a Pcmax,c like as a CC index or a cell index is included. And, $P_{PUSCH}$ indicates a power value used for transmitting PUSCH. A type 2 PHR can be defined by PHR=Pcmax−$P_{PUCCH}$−$P_{PUSCH}$. Likewise, the Pcmax indicates a UE transmission maximum power value configured according to a component carrier or a cell, the $P_{PUSCH}$ indicates a power value used for transmitting PUSCH, and the $P_{PUCCH}$ indicates a power value used for transmitting PUCCH.

In case of being requested by a RAN2, it may be able to discuss triggers for PHR, whether the two types of PHR are always transmitted in a same subframe or subframes different from each other, a size of bit used for PHR, and which CC or cell transmits the PHR. For instance, the type 2 PHR can be induced for a subframe to which PUCCH is not practically transmitted thereto. In this case, PUCCH format 1A is used as a reference format. In case that the type 2 PHR is induced for a subframe to which the PUCCH is transmitted thereto, the PUCCH format used for the type 2 PHR corresponds to the PUCCH format practically transmitted.

In the following description, the content related to the PHR in RAN2 is described.

It should have one dl-PathlossChange parameter per UE. And, it should have one periodicPHR-Timer timer per UE. It should have one timer consisted of one value and valid for a UE in all component carriers or cells. A user equipment is permitted to transmit a PHR report in a random UL cell or a component carrier (CC). For instance, the PHR of a serving cell 1 or a component carrier 1 (CC 1) can be transmitted in a serving cell 2 or a component carrier 2 (CC2). And, only one prohibitPHR-Timer value is configured. One timer running exists per serving cell or component carrier (CC).

And, the user equipment may be able to transmit a type 1 PHR to the base station as the PHR of a secondary cell (Scell). If a parallel PUCCH and PUSCH assignment are not supported in a primary cell (Pcell), the type 1 PHR can be used for the Pcell and the Scell. In this case, the PHR is same with that of Rel-8/9. On the contrary, in case that the parallel PUCCH and PUSCH assignment are supported, if the PUCCH and the PUSCH transmission exist in the Pcell in this TTI, the user equipment is able to transmit both the type 1 PHR and the type 2 PHR to the base station in the Pcell.

In case that the parallel PUCCH and PUSCH assignment are supported and PUSCH transmission exists only in the Pcell in this TTI, the user equipment transmits both the type 1 PHR and the type 2 PHR to the base station in the Pcell or may be able to transmit the type 1 PHR only. In case that the parallel PUCCH and PUSCH assignment are supported and PUCCH transmission exists only in the Pcell in this TTI, the user equipment may not transmit the PHR in the Pcell. When a PHR report is triggered, the user equipment may be able to report the PHR for all configured CCs.

A configured UE maximum output power $P_{CMAX}$ can be defined by a following Formula 1. It may be a limited value.

$$P_{CMAX\_L} - T(P_{CMAX\_L}) \leq P_{CMAX} \leq P_{CMAX\_H} + T(P_{CMAX\_H}) \quad \text{[Formula 1]}$$

In this case, the $P_{CMAX\_L}$ corresponds to $\text{MIN}\{P_{EMAX\_H} - T_C, P_{PowerClass} - \text{MPR} - \text{A-MPR} - \Delta T_C\}$, the $P_{CMAX\_H}$ corresponds to $\text{MIN}\{P_{EMAX\_H}, P_{PowerClass}\}$, the $P_{CMAX}$ can be defined as Table 4, and the $P_{CMAX\_L}$ and the $P_{CMAX\_H}$ can be applied individually. The $P_{EMAX\_H}$ is a given value from the IE P-Max defined by the mobile communication standard document 3GPP TS 36.214. The $P_{PowerClass}$ indicates a maximum UE power written without consideration of a permissible tolerance. The $P_{PowerClass}$ is a value that the base station is able to inform the user equipment. The base station is able to signal the A-MPR to the user equipment. The $\Delta T_C$ value may be a pre-defined value. The $T_C$ may correspond to 1.5 dB or 0.

TABLE 4

| $P_{CMAX}$ tolerance | |
|---|---|
| $P_{CMAX}$ (dBm) | Tolerance $T(P_{CMAX})$ (dB) |
| $21 \leq P_{CMAX} \leq 23$ | 2.0 |
| $20 \leq P_{CMAX} < 21$ | 2.5 |
| $19 \leq P_{CMAX} < 20$ | 3.5 |
| $18 \leq P_{CMAX} < 19$ | 4.0 |
| $13 \leq P_{CMAX} < 18$ | 5.0 |
| $8 \leq P_{CMAX} < 13$ | 6.0 |
| $-40 \leq P_{CMAX} < 8$ | 7.0 |

A power headroom (PH) of a user equipment valid for a subframe of index i is defined by Formula 2 as follows and it corresponds to a type 1 PHR.

$$PH(i) = P_{CMAX} - \{10 \log_{10}(M_{PUSCH}(i)) + P_{O\_PUSCH}(j) + \alpha(j) \cdot PL + \Delta_{TF}(i) + f(i)\}[dB] \quad \text{[Formula 2]}$$

In this case, the $P_{CMAX}$ indicates a maximum transmit power of a configured user equipment. The $M_{PUSCH}(i)$ corresponds to a parameter indicating a bandwidth of PUSCH resource allocation, which is expressed by the number of resource blocks valid for a subframe of index i. The $M_{PUSCH}(i)$ is a value assigned by the base station. The $P_{O\_PUSCH}$ a is a parameter configured by adding a cell-specific nominal component $P_{O\_NOMINAL\_PUSCH}(j)$ provided by an upper layer and a UE-specific component $P_{O\_UE\_PUSCH}(j)$ provided by the upper layer. The $P_{O\_PUSCH}(j)$ is the value of which the base station informs the user equipment. The $\alpha(j)$ is a 3 bit-long cell-specific parameter transmitted by the base station provided by the upper layer. If T is '0' or '1', it corresponds to '$\alpha \in \{0, 0.4, 0.5, 0.6, 0.7, 0.8, 0.9, 1\}$' and if T is '2', the $\alpha(j)$ corresponds to '1'. The $\alpha(j)$ is the value of which the base station informs the user equipment.

The PL is a DL path loss (or signal loss) estimated value calculated by the user equipment in dB unit. The PL is expressed as 'PL=referenceSignalPower–higher layer filteredRSRP'. The f (i) is a value indicating a current PUSCH power control adjustment status and may be represented as a current absolute value or an accumulated value.

Regarding a PHR reporting of a user equipment, a maximum power reduction (MPR) can be considered. The MPR is a value changeable according to a modulation order/channel bandwidth. The MPR can be expressed as Table 5 as follows.

TABLE 5

| | Channel bandwidth / Transmission bandwidth configuration) (RB) | | | | | | |
|---|---|---|---|---|---|---|---|
| Modulation | 1.4 MHz | 3.0 MHz | 5 MHz | 10 MHz | 15 MHz | 20 MHz | MPR (dB) |
| QPSK | >5 | >4 | >8 | >12 | >16 | >18 | ≤1 |
| 16 QAM | ≤5 | ≤4 | ≤8 | ≤12 | ≤16 | ≤18 | ≤1 |
| 16 QAM | >5 | >4 | >8 | >12 | >16 | >18 | ≤2 |

A-MPR (additional-MPR) indicates the maximum power reduction resulted from a regional/band specific additional request. The A-MPR can be expressed as Table 6 as follows (it may refer to 3GPP LTE TS. 36.101).

TABLE 6

| Network signaling value | Requirements (sub-clause) | E-UTRA Band | Channel bandwidth (MHz) | Resources Blocks ($N_{RB}$) | A-MPR (dB) |
|---|---|---|---|---|---|
| NS_01 | 3GPP LTE TS.36.101 6.6.2.1.1 | Table 5.5-1 | 1.4, 3, 5, 10, 15, 20 | Table 5.6-1 | NA |
| NS_03 | 6.6.2.2.1 | 2, 4, 10, 35, 36 | 3 | >5 | ≤1 |
| | | | 5 | >6 | ≤1 |
| | | | 10 | >6 | ≤1 |
| | | | 15 | >8 | ≤1 |
| | | | 20 | >10 | ≤1 |
| NS_04 | 6.6.2.2.2 | TBD | TBD | TBD | |
| NS_05 | 6.6.3.3.1 | 1 | 10, 15, 20 | ≥50 | ≤1 |
| NS_06 | 6.6.2.2.3 | 12, 13, 14, 17 | 1.4, 3, 5, 10 | Table 5.6-1 | n/a |
| NS_07 | 6.6.2.2.3 6.6.3.3.2 | 13 | 10 | Table 6.2.4-2 | Table 6.2.4-2 |
| NS_08 | 6.6.3.3.3 | 19 | 10, 15 | >29 | ≤1 |
| | | | | >39 | ≤2 |
| | | | | >44 | ≤3 |
| NS_09 | 6.6.3.3.4 | 21 | 10, 15 | >40 | ≤1 |
| | | | | >55 | ≤2 |
| NS_10 | | 20 | 20 | Table 6.2.4-3 | Table 6.2.4-3 |
| ... | | | | | |
| NS_32 | — | — | — | — | — |

Table 7 and 8 indicate the A-MPR for network signaling values 'NS 07' and 'NS 10', respectively.

TABLE 7

| | | Region A | Region B | | Region C |
|---|---|---|---|---|---|
| RB_start[1] | | 0-12 | 13-18 | 19-42 | 43-49 |
| L_CRB[2] [RBs] | 6-8 | 1 to 5 and 9-50 | >8 | >18 | ≤2 |
| A-MPR [dB] | ≤8 | ≤12 | ≤12 | ≤6 | ≤3 |

TABLE 8

|  | Region A | Region B |
|---|---|---|
| RB_start[1] | [0-15] | [76-90] |
| L_CRB[2] [RBs] | [1-25] | [1-23] |
| A-MPR [dB] | ≤[5] | ≤[5] |

Referring to Table 7 and 8, the RB_start indicates a lowest RB index of a transmitted resource block. The L_CRB indicates a length of contiguous resource block allocation. Regarding an intra-subframe frequency hopping between two regions, the A-MPR value greater than the other among the two regions can be applied to all slots of a corresponding subframe.

The object of the present invention is to configure a power headroom reporting (PHR) to effectively operate in a DL/UL carrier aggregation (CA) situation. This enables a base station to recognize a power status situation of a user equipment better and then it is intended for the base station to improve the performance of resource allocation and a related control for the user equipment.

Figure 5:
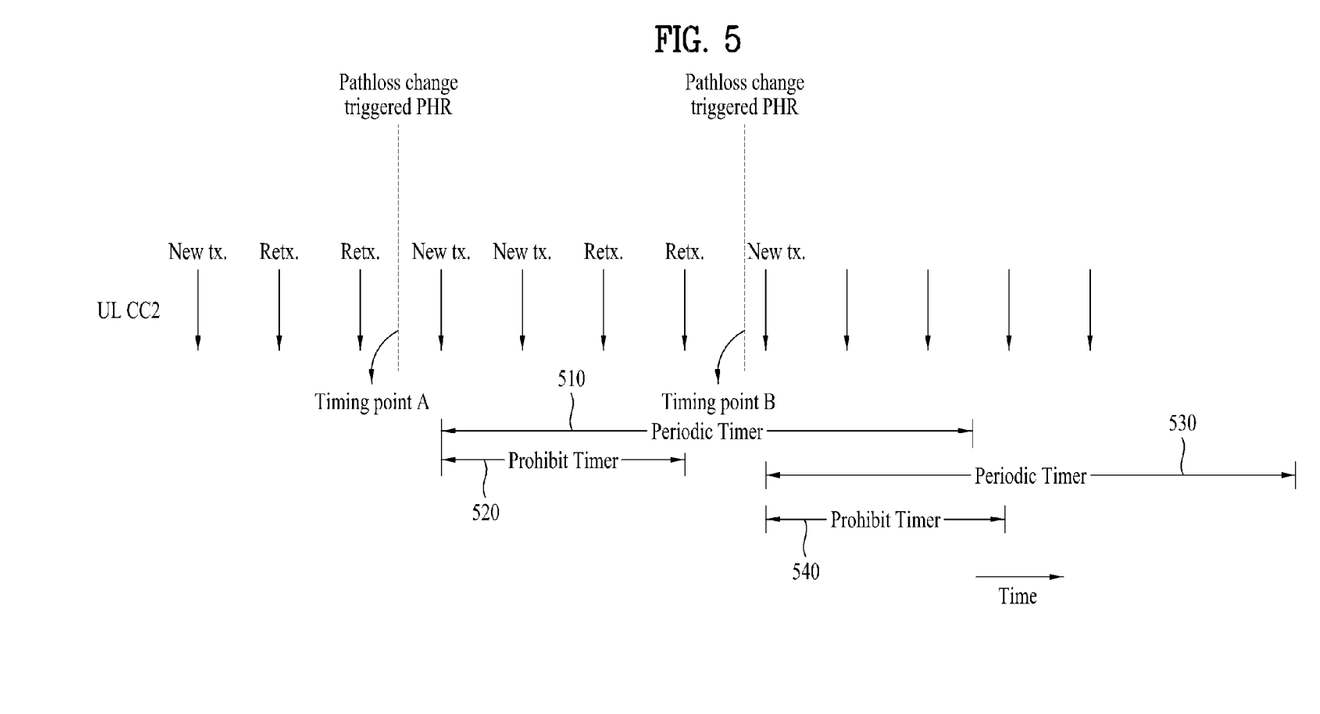
FIG. 5 is a diagram to describe a method of a PHR operation.

FIG. 5 is a diagram to describe a method of a PHR operation.

Referring to FIG. 5, assume that a PHR triggering according to the change of a path loss has occurred on timing point A and B on a UL component carrier 2 (UL CC 2). If the PHR is triggered on the timing point A, a periodic timer operates for a prescribed time 510 and a prohibit timer also starts to operate 520. And, if the PHR is triggered again on the timing point B, the periodic timer operates for a prescribed time 530 and the prohibit timer also starts to operate 540.

In case of FIG. 5, when a user equipment has a UL resource for a new transmission, the PHR is triggered on the timing point B since the periodic timer becomes greater than a preset value (DL_PathlossChange) of a transmission path loss after the PHR transmission, before the periodic report timer (PeriodicPHR-Timer) expires.

Figure 6A:
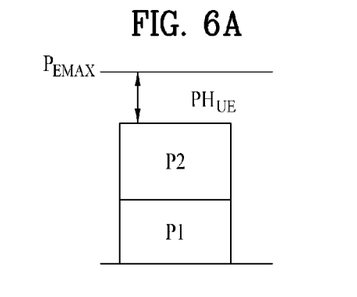
FIG. 6a is a diagram to describe a method of a PHR operation in a situation of a single carrier and FIG. 6b and FIG. 6c are diagrams to describe a method of a PHR operation in a situation of carrier aggregation.
Figure 6B:
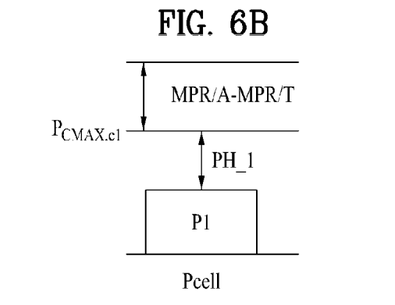
Figure 6C:
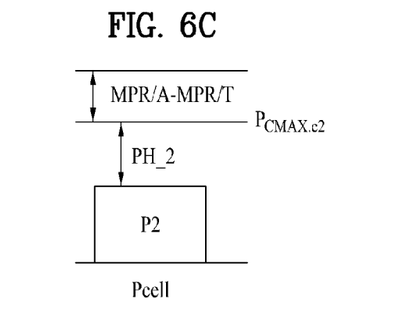

FIG. 6a is a diagram to describe a method of a PHR operation in a situation of a single carrier and FIG. 6b and FIG. 6c are diagrams to describe a method of a PHR operation in a situation of carrier aggregation.

Referring to FIG. 6a, a user equipment may be able to transmit a power headroom (PH) irrespective of a kind of cell since there exist only one component carrier or cell in a single carrier situation. In this case, the power headroom ($PH_{UE}$) corresponds to '$P_{EMAX}$-P1-P2'. Referring to FIG. 6b and FIG. 6c, the user equipment may be able to transmit a power headroom reporting per component carrier or cell. As shown in FIG. 6b, the user equipment may be able to report the power headroom reporting for a primary cell (Pcell) like '$PH_{UE}=P_{CMAX,C1}$-P1. As shown in FIG. 6c, the user equipment may be able to report the power headroom reporting for a secondary cell (Pcell) like '$PH_{UE}=P_{CMAX,C2}$-P2' to a base station. FIG. 6b and FIG. 6c not only indicates an example of forming a PHR in a manner of determining a $P_{CMAX,C}$ value per cell or component carrier in the carrier aggregation situation but also shows a concept for a user equipment PHR (UE PHR) as well. In this case, the user equipment PHR (UE PHR) is a value resulted from subtracting a total power for a scheduled resource from a maximum transmittable power ($P_{UE\_MAX}$) of the user equipment.

The MPR value expressed in Formula 1 is a value of which a base station cannot be aware and can be expressed as shown in the Table 5. Since the MPR value is the value of which the base station cannot be aware, it is difficult for a user equipment to predict a maximum power per cell or component carrier. The above-described A-MPR value is a value of which the base station informs the user equipment within the value defined in the Table 6.

Figure 7:
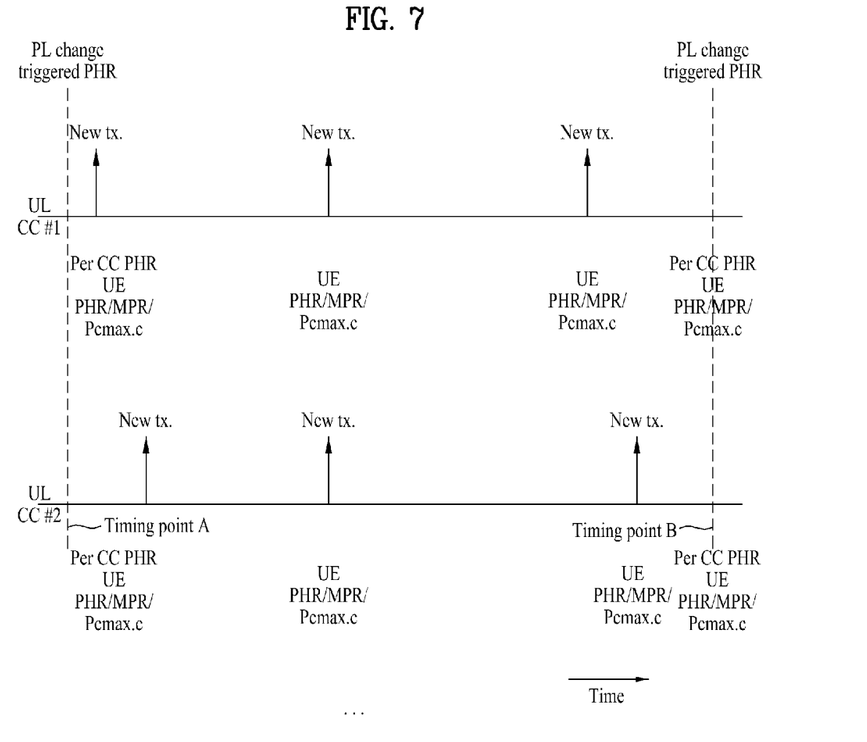
FIG. 7 is a diagram for an example of PHR configuration in a situation of carrier aggregation.

FIG. 7 is a diagram for an example of PHR configuration in a situation of carrier aggregation.

In case that a resource allocation method (e.g., a size of allocated resource and the like) of a base station changes after a PHR transmission of a user equipment, the base station becomes unable to know the precise power status of the user equipment and even it makes it worse in a carrier aggregation situation. And, in case that the user equipment transmits a PHR per cell (or per component carrier) only, it becomes more difficult for the base station to identify the power status in terms of a total power of the user equipment.

In order to solve the aforementioned problem, the user equipment may be able to additionally transmit such information as a UE PHR ($P_{UE\_MAX}$-a total power for a scheduled resource), a maximum power level ($P\_{CMAXc}$) configured per cell (or per component carrier), and an MPR to the base station besides the PHR per cell (or per component carrier).

As shown in FIG. 7, if a PHR transmission triggering condition occurs (timing point A), a periodic timer and a prohibit timer start to operate.

Although a user equipment uses a plurality of UL component carriers (UL CC1 and UL CC2) or a plurality of UL serving cells, it may be general for the user equipment to have one PHR triggering condition and one timer. Yet, the PHR triggering condition and the timer may exist per each UL component carrier or each UL serving cell, respectively. In this case, it becomes necessary to have a specific method of additionally signaling with a content related to the PHR per component carrier or serving cell.

In case that the user equipment performs an additional signaling besides the transmission of the PHR per component carrier or serving cell, the user equipment may be able to transmit the aforementioned user equipment PHR (UE PHR), the MPR, the $P_{CMAX,C}$, and the like. Although it is possible for the user equipment to transmit the power headroom (PH) information in case that there exists a UL data transmission only, it is not excluded to transmit the power headroom information to a different layer.

In the following description, various embodiments for the user equipment to transmit the PHR to the base station after a PHR triggering condition has occurred (for example, after the timing point A in FIG. 7) in a carrier aggregation situation are explained.

First of all, the user equipment may be able to transmit a user equipment PHR (UE PHR) (information) together with a PHR (information) per serving cell (or cell) or the PHR (information) per component carrier. After the user equipment has transmitted the user equipment PHR (UE PHR) (information) together with the PHR (information) per serving cell (or cell) or the PHR (information) per component carrier, an MPR may changes before the user equipment transmits a next PHR since a next PHR triggering condition (for example, the timing point B in FIG. 7) is satisfied. In this case, the user equipment may be able to additionally transmit an MPR value, which has changed in the section between the timing point A and the timing point B (in particular, between an occurring timing point of a 1$^{st}$ PHR triggering condition and the occurring timing point of a 2$^{nd}$ PHR triggering condition corresponding to the occurring timing point of the next PHR triggering condition), to the base station. In this case, the user equipment may be able to transmit the MPR value per serving cell or component carrier irrespective of timers (periodicPHR-Timer and prohibit Timer) whenever the MPR changes. Or, the user equipment may be able to transmit a maximum, a median, a minimum value, or the like among serving cells or component carriers in a manner of determining as a representative value to the base station irrespective of the timers when the MPR value changes. Unlike the above-mentioned, if the MPR changes in a specific serving cell or specific component carrier, the user equipment may be able to transmit the MPR to all serving cells or component carriers irrespective of the timers.

Meanwhile, in case that the MPR changes before the user equipment transmits a next PHR since a next PHR triggering condition (for example, the timing point B in FIG. 7) is satisfied after the user equipment has transmitted the user equipment PHR (UE PHR) (information) together with the PHR (information) per serving cell (or cell) or the PHR (information) per component carrier, the user equipment may be able to additionally transmit the user equipment PHR (information) to the base station. In this case, the user equipment may be able to solely report the UE PHR only to the base station. In this case, it is possible to re-use a transmission format of legacy LTE Rel.8/9.

As a different embodiment, a user equipment may be able to transmit a PHR per serving cell or the PHR per component carrier and an MPR after a PHR triggering condition has occurred. As mentioned in the above, in case that the MPR changes within a section (in particular, between the occurring timing point of a $1^{st}$ PHR triggering condition and the occurring timing point of a $2^{nd}$ PHR triggering condition corresponding to the occurring timing point of a next PHR triggering condition) that a next PHR is transmitted after the user equipment has transmitted the PHR per serving cell or the PHR per component carrier, the user equipment may be able to additionally transmit the MPR to a base station. In this case, as mentioned in the above, the user equipment may be able to transmit the MPR per serving cell or component carrier irrespective of timers (periodicPHR-Timer and prohibit Timer) whenever the MPR changes. Or, the user equipment may be able to transmit a maximum, a median, a minimum value, or the like among serving cells or component carriers in a manner of determining as a representative value to the base station irrespective of the timers when the MPR value changes. Or, if the MPR changes in a specific serving cell or specific component carrier, the user equipment may be able to transmit the MPR to all serving cells or component carriers irrespective of the timers.

As an another embodiment, after a PHR triggering condition has occurred, a user equipment may be able to transmit a maximum transmit power level ($P\_{CMAX,c}$), which is configured to the user equipment per serving cell or component carrier, together with a PHR per serving cell or the PHR per component carrier. In case that the MPR or the maximum transmit power level ($P\_{CMAX,c}$), which is configured to the user equipment per serving cell or component carrier, changes within a section (in particular, between the occurring timing point of a $1^{st}$ PHR triggering condition and the occurring timing point of a $2^{nd}$ PHR triggering condition corresponding to the occurring timing point of the next PHR triggering condition) that a next PHR is transmitted after the user equipment has transmitted the present PHR, the user equipment may be able to additionally transmit the maximum transmit power level ($P\_{CMAX,c}$), which is configured to the user equipment per serving cell or component carrier within the section transmitting the next PHR, or the MPR to the base station. In this case, as described in the above, the user equipment may be able to transmit the additionally transmitted maximum transmit power level ($P\_{CMAX,c}$) or the MPR per serving cell or component carriers whenever the MPR changes irrespective of timers (periodicPHR-Timer and prohibit Timer). Or, the user equipment may be able to transmit a maximum, a median, a minimum value, or the like among serving cells or component carriers in a manner of determining as a representative value to the base station irrespective of the timers when the MPR value changes. Or, if the MPR or the maximum transmit power level ($P\_{CMAX,c}$) changes in a specific serving cell or specific component carrier, the user equipment may be able to transmit the MPR or the maximum transmit power level ($P\_{CMAX,c}$) to all serving cells or component carriers irrespective of the timers.

MAC CE per serving cell or component carrier transmitted by the user equipment can be configured per serving cell or component carrier (in this case, the MAC CE can be configured with all informations occurred in a configured serving cell or component carrier or can be configured with a scheduled serving cell or component carriers only) or may be configured with a single MAC CE type (the principle mentioned in the above can be applied herein either). The present invention does not care about this.

In case of transmitting a PHR by a user equipment, if the PHR is configured with the MAC CE type, a user equipment PHR (UE PHR) can be configured with the same format and may be then able to being applied. Or, if the user equipment PHR is transmitted on every change of the MPR, it may be able to re-use the format of a legacy LTE Release 8. Unlike the cases mentioned above, in case of the MPR and the maximum transmit power level ($P\_{CMAX,c}$), overhead can be minimized by using a new format, which is defined in consideration of a range.

As mentioned in the above, the user equipment may be able to transmit a PHR via a physical layer as well as via an upper layer (e.g., RRC layer). In case of transmitting via the physical layer, the user equipment may transmit the PHR in a manner of defining the PHR in a general data in a form of piggyback or on a UL control channel and the like. And, in case that a power reduction factor, which may additionally occurs, is considered, as described earlier, the user equipment may be able to transmit the PHR via a physical layer as well as via an upper layer (e.g., RRC layer).

In general, in case that a user equipment configures MPR values according to a resource allocation in a manner of fixing, it may be able to consider a method of exchanging information with a base station when the user equipment performs a network entry/re-entry or a method of transmitting a PHR to the base station only one time when the MPR changes. In this case, the PHR can be transmitted in an upper layer or a physical layer.

In case that a method for a base station to allocate a resource (e.g., a size of allocated resource and the like) changes after a user equipment has transmitted a PHR, the user equipment additionally transmits an MPR per cell (or per component carrier), a maximum transmit power level ($P\_{CMAX,c}$), or a user equipment PHR to the base station and the base station may be then able to identify a power status of the user equipment more easily.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of transmitting a power headroom reporting and a user equipment device therefor are industrially available for various wireless communication systems including 3GPP LTE, LTE-A, IEEE 802.16 and the like.

What is claimed is:

1. A method of transmitting a power headroom reporting (PHR), which is transmitted by a user equipment in a wireless communication system supporting a plurality of serving cells, the method comprising:
    transmitting one of maximum transmit power information, maximum power reduction (MPR) information and user equipment PHR information configured to the user equipment per at least one serving cell among a plurality of the serving cells and PHR information per at least one serving cell configured to the user equipment to a base station if a first PHR triggering condition occurs; and
    transmitting changed MPR information, changed maximum transmit power information, or changed user equipment PHR information if the MPR information or the maximum transmit power information changes,
    wherein the user equipment PHR information corresponds to a value resulted from subtracting a total power for scheduled resources from a maximum transmittable power level of the user equipment.

2. The method of claim 1, wherein the changed MPR information, the changed maximum transmit power information, or the changed user equipment PHR information is transmitted on each of the at least one serving cell.

3. The method of claim 1, wherein if the changed MPR information, the changed maximum transmit power information, or the changed user equipment PHR information changed for a specific serving cell only, the changed MPR information, the changed maximum transmit power information, or the changed user equipment PHR information is transmitted on all of the at least one serving cell configured to the user equipment.

4. The method of claim 1, wherein the changed MPR information, the changed maximum transmit power information, or the changed user equipment PHR information is transmitted between a occurring timing point of the first PHR triggering condition and the occurring timing point of a second PHR triggering condition corresponding to the occurring timing point of a next PHR triggering condition.

5. A user equipment device for transmitting a power headroom reporting (PHR) in a wireless communication system supporting a plurality of serving cells, the user equipment comprising:
    a transmitter configured to:
    transmit one of maximum transmit power information, maximum power reduction (MPR) information and user equipment PHR information configured to the user equipment per at least one serving cell among a plurality of the serving cells and PHR information per at least one serving cell configured to the user equipment to a base station if a first PHR triggering condition occurs; and
    transmit changed MPR information, changed maximum transmit power information, or changed user equipment PHR information; and
    a processor configured to control the transmitter to transmit the changed MPR information, the changed maximum transmit power information, or the changed user equipment PHR information if the MPR information or the maximum transmit power information changes,
    wherein the user equipment PHR information corresponds to a value resulted from subtracting a total power for scheduled resources from a maximum transmittable power level of the user equipment.

6. The user equipment device of claim 5, wherein the transmitter is configured to transmit the changed MPR information, the changed maximum transmit power information, or the changed user equipment PHR information on each of the at least one serving cell.

7. The user equipment device of claim 5, wherein if the changed MPR information, the changed maximum transmit power information, or the changed user equipment PHR information changed for a specific serving cell only, the transmitter is configured to transmit the changed MPR information, the changed maximum transmit power information, or the changed user equipment PHR information on all of the at least one serving cell configured to the user equipment.

8. The user equipment device of claim 5, wherein the transmitter is configured to transmit the changed MPR information, the changed maximum transmit power information, or the changed user equipment PHR information between a occurring timing point of the first PHR triggering condition and the occurring timing point of a second PHR triggering condition corresponding to the occurring timing point of a next PHR triggering condition.

* * * * *